US010771994B2

(12) United States Patent
Roman et al.

(10) Patent No.: US 10,771,994 B2
(45) Date of Patent: Sep. 8, 2020

(54) METHOD AND TEST SYSTEM FOR MOBILE NETWORK TESTING AS WELL AS A NETWORK TESTING SYSTEM (71) Applicant: Rohde & Schwarz GmbH & Co. KG, Munich (DE)

(72) Inventors: Miguel Angel Roman, Munich (DE); David Gonzalez, Munich (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 0 days.

(21) Appl. No.: 16/242,878

(22) Filed: Jan. 8, 2019

(65) Prior Publication Data

US 2019/0246299 A1 Aug. 8, 2019

(30) Foreign Application Priority Data

Feb. 7, 2018 (EP) .................................. 18155620

(51) Int. Cl.
*H04W 24/08* (2009.01)
*H04W 24/10* (2009.01)
*H04L 12/24* (2006.01)
*H04L 12/26* (2006.01)
*G06N 3/04* (2006.01)
*G06N 3/08* (2006.01)
*H04W 24/06* (2009.01)

(52) U.S. Cl.
CPC .......... *H04W 24/08* (2013.01); *G06N 3/0454* (2013.01); *G06N 3/088* (2013.01); *H04L 41/16* (2013.01); *H04L 43/50* (2013.01); *H04W 24/06* (2013.01); *H04W 24/10* (2013.01); *H04L 43/0852* (2013.01); *H04L 43/0888* (2013.01)

(58) Field of Classification Search
CPC .. H04W 24/06; H04W 165/20; H04B 17/309; G06K 9/6264; H04L 41/16
USPC .......................................... 455/425; 702/150
See application file for complete search history.

(56) References Cited

U.S. PATENT DOCUMENTS

| 2008/0085692 | A1 | 4/2008 | Hart et al. | |
|---|---|---|---|---|
| 2010/0130195 | A1* | 5/2010 | Rohaly | H04W 24/06 455/425 |
| 2013/0225229 | A1 | 8/2013 | Al-Shalash | |
| 2015/0120237 | A1* | 4/2015 | Gouda | G06T 7/215 702/150 |
| 2015/0373656 | A1 | 12/2015 | Safavi | |
| 2016/0021503 | A1 | 1/2016 | Tapia | |
| 2017/0353249 | A1* | 12/2017 | Neel | H04B 17/309 |
| 2018/0317095 | A1* | 11/2018 | Rumler | H04W 16/20 |

(Continued)

OTHER PUBLICATIONS

Zhang, C., et al., "ZipNet-GAN: Inferring Fine-Grained Mobile Traffic Patterns via a Generative Adversarial Neural Network," ACM CoNEXT, Dec. 2017, 13 pages.

*Primary Examiner* — William D Cumming
(74) *Attorney, Agent, or Firm* — Christensen O'Connor Johnson Kindness PLLC (57) ABSTRACT A method for mobile network testing uses at least one testing device that is configured to be connected to the mobile network. A predefined set of test procedures is run on the at least one testing device for generating at least one heat map assigned to the mobile network. The test results of the test procedures are evaluated via a machine learning model. The machine learning model is trained to complete missing information on an already present heat map based on the test results obtained.

15 Claims, 3 Drawing Sheets (56) References Cited

U.S. PATENT DOCUMENTS

2019/0080206 A1\* 3/2019 Hotson ................ G06K 9/6264
2019/0246299 A1\* 8/2019 Roman .................. H04L 41/16

\* cited by examiner

METHOD AND TEST SYSTEM FOR MOBILE NETWORK TESTING AS WELL AS A NETWORK TESTING SYSTEM

FIELD OF THE DISCLOSURE

Embodiments of the present disclosure relate to a method for mobile network testing as well as a test system for mobile network testing. Further, embodiments of the present disclosure relate to a network testing system.

BACKGROUND

Nowadays, telecommunication networks as well as network communication itself increase so that testing of mobile networks becomes more and more important. So far, operators have to run certain drive testing campaigns with special testing equipment in order to test the mobile network(s). The drive testing campaigns simulate the behavior of mobile subscribers within the mobile network(s) under test wherein the behavior relates to calls, web browsing and/or video playing.

While running the drive testing campaigns, the special testing equipment records network measurements wherein the data recorded is later used to create a so-called heat map of the mobile network being a graphical representation of the measured data. For instance, the different network measurements are used to generate coverage maps of certain areas that indicate the respective network coverage in the respective areas.

In the state of the art, several testing campaigns have to be run in order to obtain the desired information or rather to obtain sufficient data to generate the heat map without any empty areas. Thus, a lot of efforts are required in order to generate the graphical representation (heat map) with valid and complete data or rather information.

Accordingly, there is a need for a simpler and cost-efficient possibility to obtain the data or rather information required so that mobile network testing can be improved.

SUMMARY

Embodiments of the present disclosure provide a method for mobile network testing by using at least one testing device configured to be connected to the mobile network, comprising the following steps:

running a predefined set of test procedures on the at least one testing device for generating at least one heat map assigned to the mobile network;

evaluating the test results of the test procedures via a machine learning model; and training the machine learning model to complete missing information on an already present heat map based on the test results obtained.

Further, embodiments of the present disclosure provide a test system for mobile network testing, comprising at least one testing device and a processing unit configured to run a machine learning model to be trained, wherein the processing unit is configured to receive test results of a set of test procedures run on the at least one testing device and to evaluate the test results via the machine learning model, and wherein the processing unit is configured to train the machine learning model to complete missing information on an already present heat map based on the test results obtained.

The present disclosure is based on the finding that the network testing can be simplified and accelerated by using deep learning models such as a machine learning model in order to predict heat map information that can be used to complete missing information on an already present heat map generated by a single test or a less number of test procedures compared to the number of test procedures run in the state of the art. Thus, the time spent for mobile network testing is reduced significantly once the machine learning model has been trained as defined above.

The training of the machine learning model relates to an unsupervised learning or a semi-supervised learning as the data related to the test results (training data) is directly used for training purposes without any labeling, namely without classification or categorization.

Generally, the machine learning model can be trained such that empty areas of an incomplete heat map are filled with respective information. The respective information used to complete the incomplete heat map is derived from the training. Accordingly, the respective machine learning model is trained to infer a mathematical model, for instance a function, to describe hidden structure from the unlabeled data inputted.

The heat map is generally assigned to network characteristics such as network key performance indicator(s) that are also called KPIs.

According to an aspect, the test procedures running on the at least one testing device simulate the behavior of participants of the mobile network, for example wherein calls, web browsing, video playing and/or downloads are simulated. Hence, the test procedures used for generating data that are evaluated for training purposes correspond to the drive testing campaigns that are run in the state of the art every time a mobile network is tested. However, the time spent as well as the efforts are reduced due to the fact that the test procedures are only run once in order to train the machine learning model. The behavior of the participants of the mobile network corresponds to the typical behavior of the mobile subscribers mentioned earlier.

Further, the training of the machine learning model may be based on inputting valid and complete heat map information obtained from the test results. Thus, regular test procedures are run during the training step of the respective machine learning model such that valid and complete heat map information can be used for evaluating purposes in order to train the machine learning model appropriately. Thus, the machine learning model is trained to recognize relationships between different information and/or data obtained, for example network key performance indicator(s), wherein the respective relationships can be used to complete missing information on an already present heat map being incomplete once the machine learning model has been trained.

For instance, the valid and complete heat map information comprises network characteristics such as network key performance indicator(s), for example wherein the network characteristics correspond to coverage information, information regarding covered networks, throughput network information, bandwidth information, signal strength information, interference information and/or latency information. Depending on the heat map to be used, the different network characteristics are used during the test procedures for evaluating and training purposes. For example, the test procedures may relate to a certain network parameter (network characteristics) being of interest.

Generally, a heat map is generated to illustrate a certain network parameter (network characteristics) being of interest.

The machine learning model can be trained to provide several network parameters (network characteristics) even though the respective one was not measured due to relationships between different network parameters (network characteristics), for example the network key performance indicator(s).

The heat map already present may relate to a certain network parameter (network characteristics). However, the machine learning model trained is able to complete missing information, for instance regarding another network parameter (network characteristics). Thus, the missing information may correspond to a different network parameter (network characteristics) compared to the already present heat map illustrating a certain network parameter (network characteristics).

Moreover, the missing information may relate to empty areas within the already present heat map so that (empty) areas of the map, assigned to the same network parameter (network characteristics), are completed by the machine learning model trained.

According to another aspect, the at least one testing device records network characteristics obtained from different network measurements. Thus, the at least one testing device used for mobile network testing is configured to measure and record the respective network parameter (network characteristics) in order to be able to train the machine learning model appropriately. Due to the different network measurements, the machine learning model is enabled to provide missing information regarding other network parameter (network characteristics).

Moreover, the training of the machine learning model may take geolocation information and/or time information into account. Hence, the data measured, for example the network parameter (network characteristics), is provided with a timestamp and/or the respective geolocation information, for instance topographical information and or the respective position. This information may also be taken into account for training the machine learning model.

According to an embodiment, the test results are evaluated on the testing device itself. Alternatively or additionally, the test results may be forwarded to a separate evaluation unit that evaluates the test results. For instance, the separate evaluation unit may be a server being connected to the mobile network and/or the at least one testing device. Hence, the evaluation may be done internally or externally. This may depend on the computational power of the respective device.

In general, the testing device and/or the evaluation unit may comprise a network interface wherein the network interface is a wired one or a wireless one. However, the network interface is configured to connect the respective device or rather unit with the network(s) to be tested.

Another aspect provides that the machine learning model is provided by generative adversarial networks and/or a derivative of generative adversarial networks. Generally, generative adversarial networks (GANs) are assigned to the class of artificial intelligence algorithms used in unsupervised machine learning. The networks are implemented by a system of two neural networks contesting with each other in a zero-sum game framework. Hence, one network generates candidates and the other one evaluates the generated ones.

Generally, the test system may be configured to perform a method as described above.

Further, embodiments of the present disclosure provide a method for mobile network testing by using at least one testing device configured to be connected to a mobile network, comprising the following steps:

providing a network testing system configured to complete missing information on an already present heat map by running a machine learning model trained;

performing a single test by using the at least one testing device;

evaluating the test result of the single test, wherein the test result corresponds to a heat map with missing information; and obtaining a valid and complete heat map from the network testing system, wherein the missing information was completed by the machine learning model trained.

Thus, the heat map with regard to the network parameter of interest (network characteristics of interest) is obtained in an easy and cost-efficient manner as the machine learning model trained previously is used to complete the missing information within the heat map that may occur due to the fact that only a single test was performed with the at least one testing device. However, the testing is done fast as only a single (real) test is performed. Accordingly, the number of tests can be reduced significantly once the machine learning model has been trained.

The machine learning model was trained to recognize relationships between the data and/or information obtained by the single test, for example among the different network parameter(s) such as network key performance indicator(s), in order to complete the missing information within the heat map. Hence, the machine learning model being trained is configured to fill empty areas of the incomplete heat map with the respective information due to the training performed previously.

In addition, the machine learning model was trained to provide heat map information regarding another network parameter by evaluating the test results of the single test performed so that the overall testing time can be further reduced. Thus, the missing information may also relate to data concerning at least another network parameter, for example another network key performance indicator.

In general, two or more tests can be performed in order to improve the heat map provided that has to be completed by the machine learning model trained. In other words, the amount of missing information is reduced by increasing the number of tests performed by using the at least one testing device.

The testing device used may correspond to the one that was used for training the machine learning model.

In certain embodiments, the machine learning model used is trained by a method as defined above.

Further, embodiments of the present disclosure provide a network testing system for outputting a valid and complete heat map, comprising a processing unit configured to run a machine learning model, wherein the machine learning model is trained by a method as mentioned above and/or wherein the network testing system is configured to perform a method as mentioned above.

Accordingly, the advantages mentioned above are obtained by the respective network testing system.

Further, the processing unit comprises generative adversarial networks and/or a derivative of generative adversarial networks. As mentioned above, the generative adversarial networks (GAN) are assigned to the class of artificial intelligence algorithms used in unsupervised machine learning. The networks are implemented by a system of two neural networks contesting with each other in a zero-sum game framework. Hence, one network generates candidates and the other one evaluates them.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
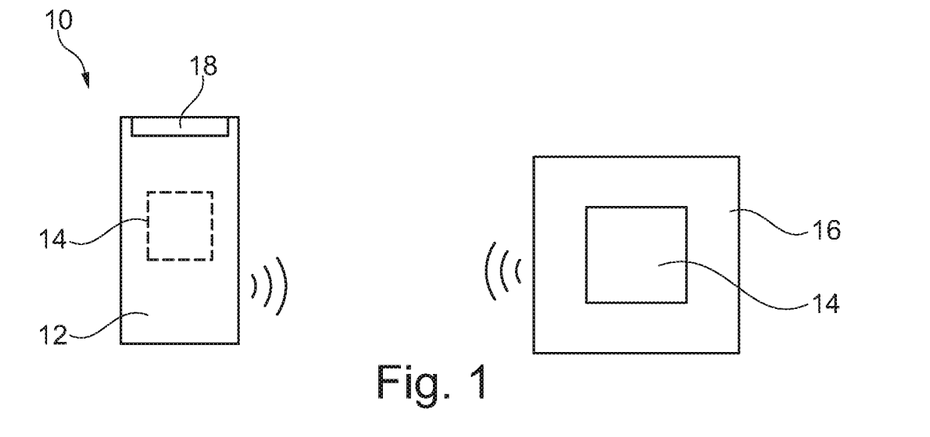
FIG. 1 schematically shows a test system for mobile network testing according to one or more embodiments of the present disclosure.

In FIG. 1, a test system 10 for a mobile network testing is shown that comprises at least one testing device 12 as well as a processing unit 14 that is configured to run a machine learning model to be trained as will be described later with reference to FIG. 2. In the shown embodiment, the processing unit 14 is provided in a separately formed analyzing device 16.

The analyzing device 16, for example the processing unit 14, is connected to the at least one testing device 12, for instance via a wired or a wireless manner as indicated in the embodiment of FIG. 1, such that the processing unit 14 receives test results of a set of test procedures run on the at least one testing device 12 for obtaining information of the network under test to which the at least one testing device 12 is connected. The at least one testing device 12 is connected to the network under test via an appropriate network interface 18 provided by an antenna unit or a cable connection, for instance.

The processing unit 14 is generally configured to evaluate the test results received from the at least one testing device 12 wherein the appropriate machine learning model is used for evaluating purposes.

Generally, the machine learning model may be established by generative adversarial networks and/or a derivative thereof. Generative adversarial networks (GANs) are assigned to the class of artificial intelligence algorithms used in unsupervised machine learning.

The networks are implemented by a system of two neural networks contesting with each other in a zero-sum game framework. Hence, one network generates candidates and the other one evaluates them. In one embodiment, each neural network is trained using a suitable technique, such as gradient descent.

Figure 2:
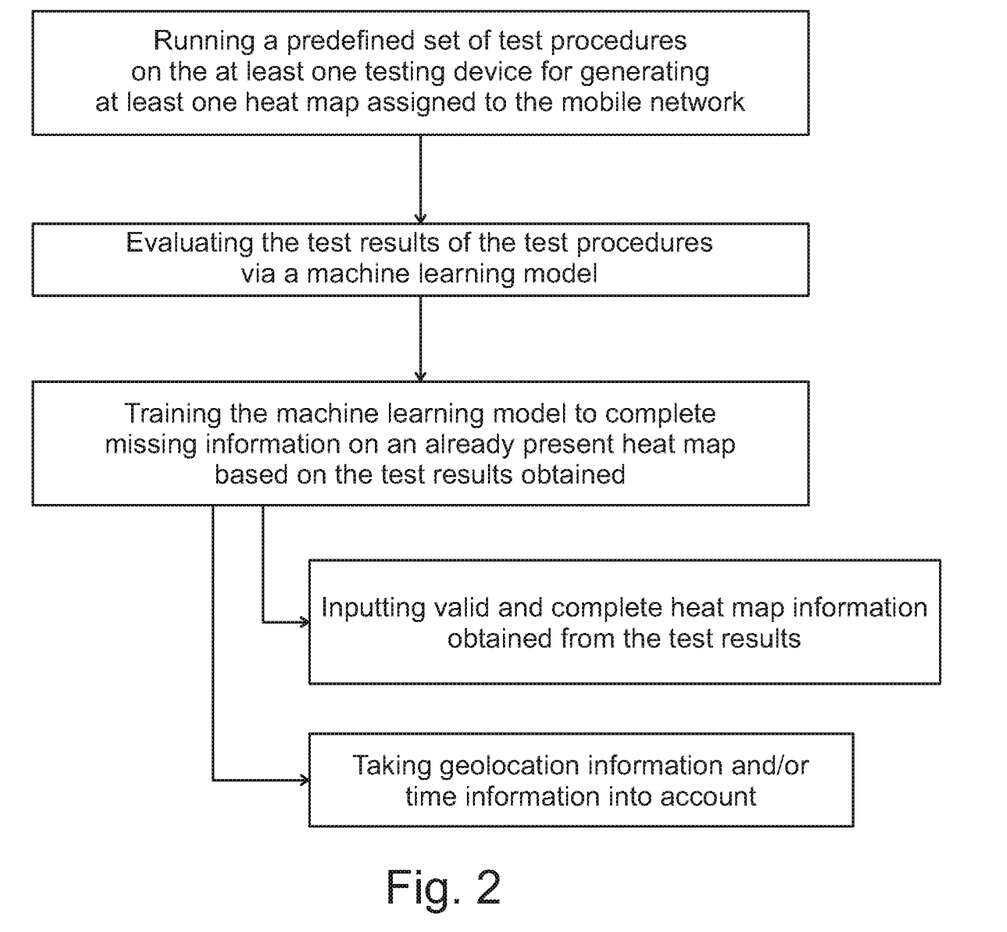
FIG. 2 shows a flowchart of a representative method for mobile network testing according to the present disclosure by using the test system of FIG. 1.

As also illustrated in FIG. 2, the test system 10, for example the processing unit 14, is configured to train the machine learning model appropriately as will be described hereinafter.

For the training purpose, a predefined set of test procedures runs on the at least one testing device 12 for generating at least one heat map assigned to the mobile network under test. The heat map may relate to a certain network parameter (network characteristics) being of interest which was obtained from a certain network measurement.

In general, several network characteristics (parameters) may be recorded by the at least one testing device 12 wherein these network characteristics (parameters) are obtained from different network measurements performed.

The network characteristics (parameters) may correspond to network key performance indicator(s) which are also called KPI(s).

In the shown embodiment, the analyzing device 16, for example the processing unit 14, is connected to the at least one testing device 12 and receives the respective test results for evaluating purposes via the machine learning model to be trained. Hence, the analyzing device 16 corresponds to a separate evaluation unit with respect to the testing device 12, for instance a server.

The machine learning model is trained such that it is able to complete missing information on an already present heat map based on the results obtained by recognizing relationships and/or correlations between different data and/or information of the appropriate data assigned to the test results, namely the network parameters (characteristics) or rather the network key performance indicator(s).

The test procedures run on the at least one testing device 12 simulate the behavior of participants of the mobile network(s) under test. For instance, calls, web browsing, video playing and/or downloads are simulated appropriately which correspond to the typical behavior of network subscribers.

For the training purposes, the machine learning model receives valid and complete heat map information obtained from the test results that are assigned to the predefined set of test procedures run on the at least one testing device 12.

Depending on the heat map being of interest, the heat map information illustrated may relate to coverage information, information regarding covered networks, throughput network information, bandwidth information, signal strength information, interference information and/or latency information. Thus, the heat map information generally corresponds to network parameters (network characteristics).

In addition to the network characteristics obtained, the training of the machine learning model may also take geolocation information and/or time information into account for training the machine learning model in a more accurate manner. Hence, topographic information may be encompassed. The time information ensures that time stamps are used for the respective information or rather data obtained during the testing.

In some embodiments, one or more computer-readable storage media is provided containing computer readable instructions embodied thereon that, when executed by a computing device, such as the processing unit 14, perform one or more steps of the method of FIG. 2 described above.

In contrast to the shown embodiment, the test results may also be evaluated on the testing device 12 itself that may comprise the processing unit 14 as indicated by the dashed lines. Hence, the processing unit 14 may be integrated in the testing device 12. However, the testing device 12 itself requires a certain computational power for being enabled to run or rather train the machine learning model directly.

Figure 3:
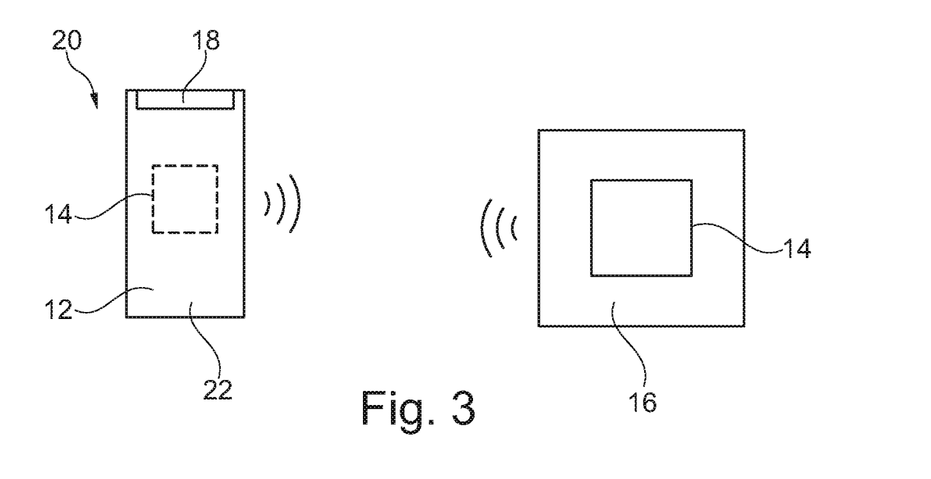
FIG. 3 schematically shows a representative embodiment of a network testing system according to the present disclosure.

In FIG. 3, a network testing system 20 is shown that comprises a testing device 22 as well as the processing unit 14 being established in an analyzing device 16.

Generally, the processing unit 14 is configured to run the machine learning model that has been trained previously as described above. Thus, the analyzing device 16 corresponds to the one shown in FIG. 1 as the respective machine learning model provided by the processing unit 14 was trained appropriately.

Further, the testing device 22 of the network testing system 20 may also correspond to the testing device 12 shown in FIG. 1 so that the same measuring equipment is used for training and measuring purposes.

Figure 4:
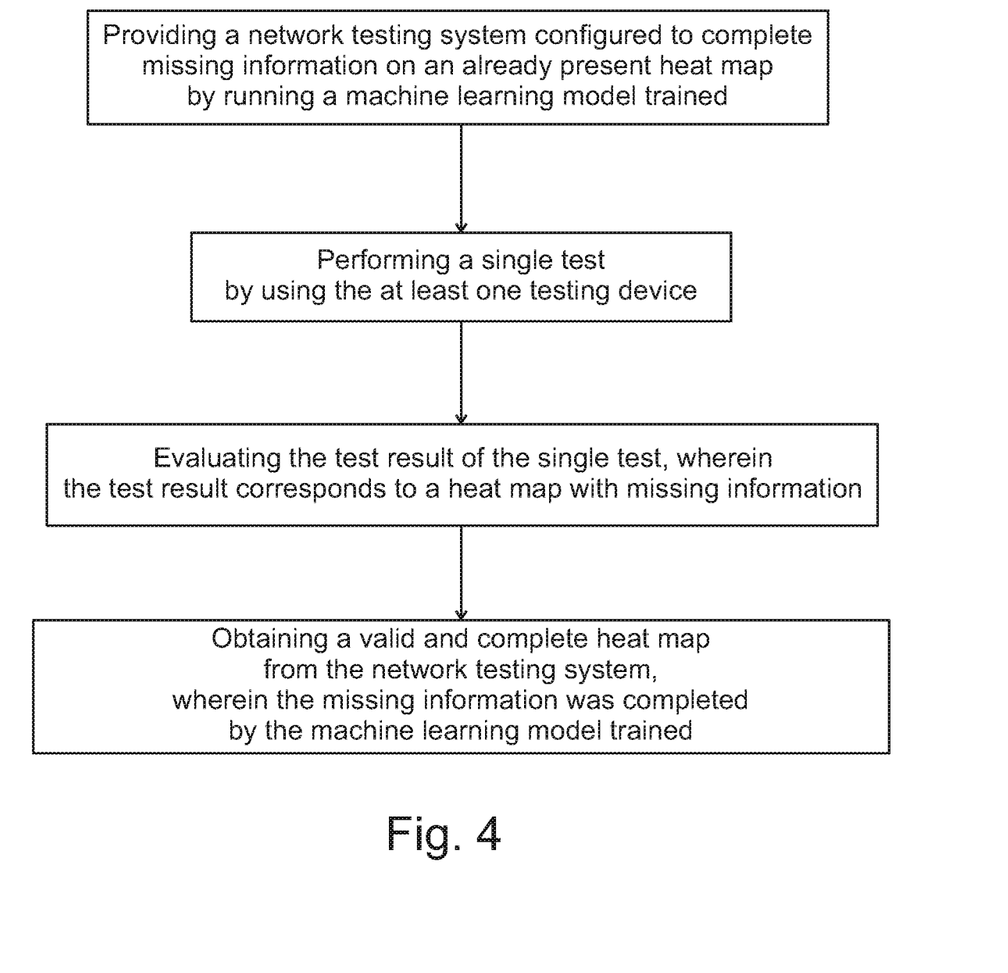
FIG. 4 shows a flowchart illustrating a representative method for mobile network testing according to the present disclosure by using the network testing system of FIG. 3.

In general, the network testing system 20 is configured to perform a method for mobile network testing as illustrated in FIG. 4.

Thus, the network testing system 20 is generally configured to complete missing information on an already present heat map by running the machine learning model trained.

For mobile network testing purposes, a single test is sufficient to be performed by using the at least one testing device 12, 22 as the machine learning model is trained appropriately. Then, the test results of the single test performed are evaluated by the processing unit 14, for example the machine learning model. The test result obtained by the single test corresponds to a heat map with missing information. For instance, the heat map provided comprises empty areas and/or the heat map only covers a certain network parameter.

This test result is forwarded to the processing unit 14, for example the machine learning model already trained, such that a valid and complete heat map is outputted by the network testing system 20, for example the processing unit 14, as the missing information is completed by the machine learning model trained which runs on the processing unit 14.

The missing information may relate to empty areas on the heat map generated which are filled appropriately due to the machine learning model trained. Moreover, the missing information may relate to at least one different network characteristics (parameter) which was not directly measured by the single test. However, the machine learning model may be enabled to output a heat map with regard to at least one other network parameter as the one measured by the single test as it refers to the relations of the respective network parameter(s), for example the network key performance indicator(s).

In general, a valid and complete heat map is obtained from the network testing system 20 even though a single test or a less number of tests were performed resulting in an incomplete heat map since the missing information is provided by the machine learning model trained used for evaluating the test results of the single test or the reduced number of test scenarios run on the at least one testing device 12.

As mentioned with regard to the test system 10, the at least one testing device 12, 22 may comprise the processing unit 14 so that the machine learning model is run on the at least one testing device 12, 22 itself.

Accordingly, the network testing can be simplified due to the fact that the machine learning model has to be trained only once. As soon as the machine learning model has been trained appropriately, the network testing can be simplified significantly as only a single test has to be done in order to obtain information that can be completed appropriately by the machine learning model trained.

Therefore, the number of test procedures to be performed for mobile network testing is reduced significantly which saves time and efforts. Thus, the testing costs can be reduced.

In some embodiments, one or more computer-readable storage media is provided containing computer readable instructions embodied thereon that, when executed by a computing device, such as the processing unit 14, perform one or more steps of the method of FIG. 4 described above.

Figure 5:
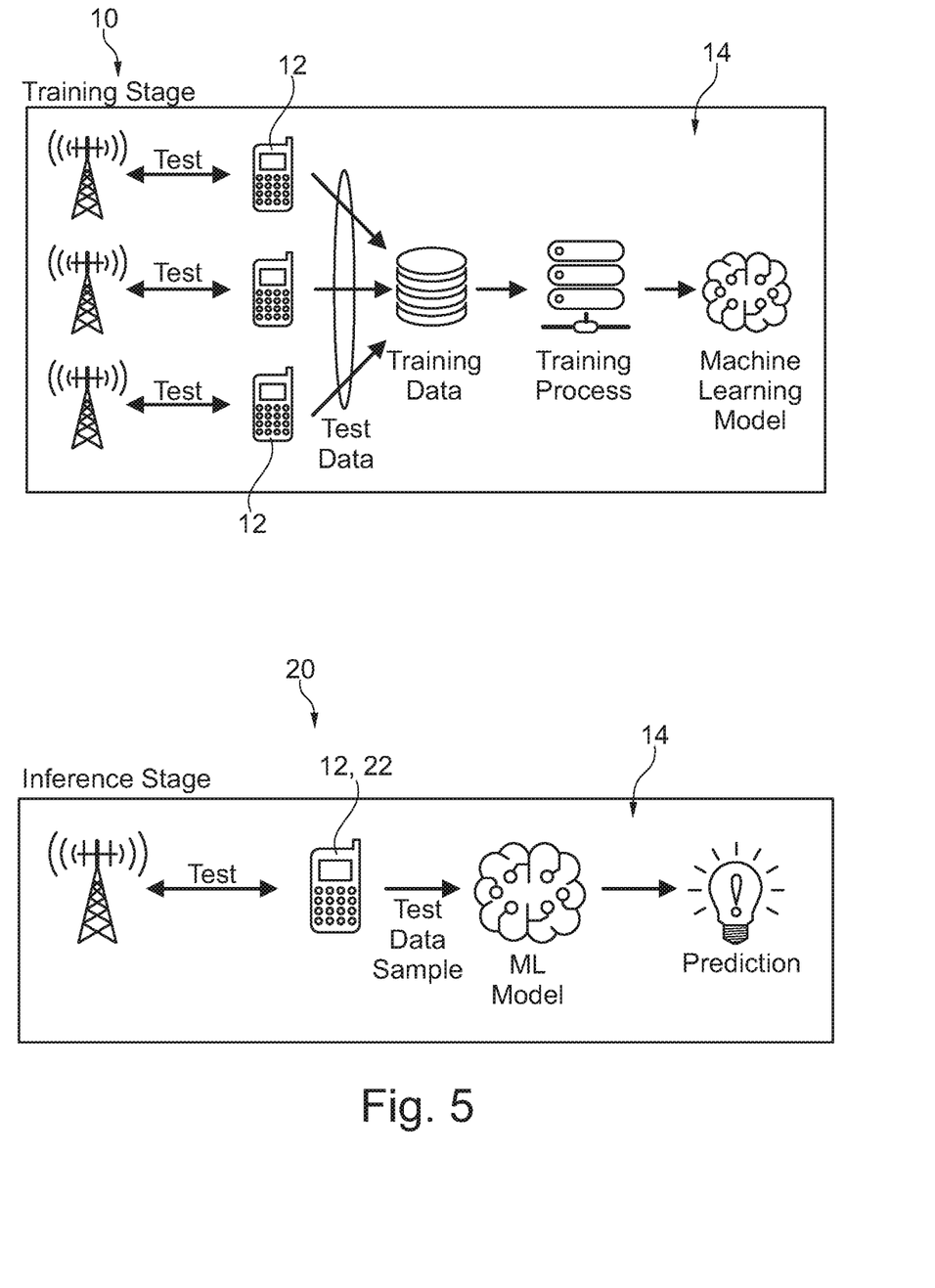
FIG. 5 shows a schematic overview illustrating a representative test system for mobile network testing according to the present disclosure and a representative network testing system according to the present disclosure.

In FIG. 5, a complete overview is shown that illustrates the test system 10 at the training stage and the network testing system 20 at the inference stage.

As indicated in FIG. 5, several test procedures are run on at least one testing device 12 or on several testing devices 12 for collecting test data used as training data for the machine learning model that is trained in a training process appropriately.

As shown for the training stage, the training process relates to inputting valid and complete heat map information obtained from the test data, namely the test results of the respective test procedures.

Once the machine learning model is trained, a single test is sufficient to complete the missing information as the machine learning model is enabled to predict the missing information appropriately. This is indicated on the right side of FIG. 5, namely at the inference stage.

Accordingly, it is no more necessary to perform the several test campaigns with a large number of tests in order to obtain the data required as they can be modeled.

The processing unit 14, for example, may be implemented as one or more microprocessors, microcomputers, microcontrollers, digital signal processors, central processing units, state machines, logic circuitries, and/or any devices that manipulate signals based on operational instructions. Among other capabilities, the processing unit 14 in some embodiments may be configured to fetch and execute computer-readable instructions stored in associated memory (not shown).

In some embodiments, the memory may comprise computer-readable media, for example, computer storage media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing or server device. The computer-readable media include cooperating or interconnected computer-readable media, which exist exclusively on a processing system or distributed among multiple interconnected processing systems that may be local to, or remote from, the processing system.

It should be appreciated that embodiments of the present disclosure, or portions thereof, may have been described in the general context of computer code or machine-useable instructions, including computer-executable instructions such as program modules, being executed by a computing system, or other machine or machines. Generally, program modules including routines, programs, objects, components, data structures, and the like refer to code that perform particular tasks or implement particular data types. Embodiments described herein may be implemented using a variety of system configurations, including handheld devices, consumer electronics, general-purpose computers, more specialty computing devices, etc. Embodiments described herein may also be implemented in distributed computing environments, using remote-processing devices that are linked through a communications network or the Internet.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method for mobile network testing by using at least one testing device configured to be connected to the mobile network, comprising:
   running a predefined set of test procedures on the at least one testing device for generating at least one heat map assigned to the mobile network, the test procedures running on the at least one testing device simulating the behavior of participants of the mobile network;
   evaluating the test results of the test procedures via a machine learning model; and
   training the machine learning model to complete missing information on an already present heat map based on the test results obtained, the machine learning model being trained such that the trained machine learning model is configured to predict heat map information in order to fill empty areas of an incomplete heat map with respective information.

2. The method according to claim 1, wherein calls, web browsing, video playing and/or downloads are simulated.

3. The method according to claim 1, wherein the training of the machine learning model is based on inputting heat map information obtained from the test results.

4. The method according to claim 3, wherein the heat map information comprises network characteristics.

5. The method according to claim 4, wherein the network characteristics correspond to coverage information, information regarding covered networks, throughput network information, bandwidth information, signal strength information, interference information and/or latency information.

6. The method according to claim 1, wherein the at least one testing device records network characteristics obtained from different network measurements.

7. The method according to claim 1, wherein the training of the machine learning model is also based on geolocation information and/or time information.

8. The method according to claim 1, wherein the test results are evaluated on the testing device itself and/or wherein the test results are forwarded to a separate evaluation unit that evaluates the test results.

9. The method according to claim 1, wherein the machine learning model is provided by generative adversarial networks and/or a derivative of generative adversarial networks.

10. A test system for mobile network testing, comprising at least one testing device and a processing unit configured to run a machine learning model to be trained, wherein the processing unit is configured to receive test results of a set of test procedures run on the at least one testing device and to evaluate the test results via the machine learning model, wherein the test procedures running on the at least one testing device simulate the behavior of participants of the mobile network, wherein the processing unit is configured to train the machine learning model to complete missing information on an already present heat map based on the test results obtained, and wherein the machine learning model is trained such that the trained machine learning model is configured to predict heat map information in order to fill empty areas of an incomplete heat map with respective information.

11. The test system according to claim 10, wherein the test system is configured to:
   run a predefined set of test procedures on the at least one testing device for generating at least one heat map assigned to the mobile network;
   evaluate the test results of the test procedures via a machine learning model; and
   train the machine learning model to complete missing information on an already present heat map based on the test results obtained.

12. The test system according to claim 10, wherein the machine learning model is provided by generative adversarial networks and/or a derivative of generative adversarial networks.

13. A method for mobile network testing by using at least one testing device configured to be connected to a mobile network, comprising:
   providing a network testing system configured to complete missing information on an already present heat map by running a trained machine learning model, wherein the trained machine learning model is configured to predict heat map information in order to fill empty areas of an incomplete heat map with respective information;
   performing a single test by using the at least one testing device;
   evaluating the test result of the single test, wherein the test result corresponds to a heat map with missing information; and
   obtaining the missing information for the heat map of the test result from the network testing system to form a complete heat map, wherein the missing information is completed by the trained machine learning model.

14. The method according to claim 13, wherein the machine learning model is provided by generative adversarial networks and/or a derivative of generative adversarial networks.

15. A network testing system for outputting a complete heat map, comprising:

a processing unit configured to run a machine learning model, wherein the machine learning model is trained by:
  running a predefined set of test procedures on at least one testing device for generating at least one heat map assigned to a mobile network, the test procedures running on the at least one testing device simulating the behavior of participants of the mobile network;
  evaluating the test results of the test procedures via a machine learning model; and
  training the machine learning model to complete missing information on an already present heat map based on the test results obtained, the machine learning model being trained such that the trained machine learning model is configured to predict heat map information in order to fill empty areas of an incomplete heat map with respective information.

* * * * *